United States Patent [19]
Mochizuki et al.

[11] Patent Number: 5,451,997
[45] Date of Patent: Sep. 19, 1995

[54] LIGHT SCANNING DEVICE WITH PLURAL RADII SCANNING LENS SYSTEM

[75] Inventors: Takeshi Mochizuki; Susumu Saito, both of Ibaraki; Akira Arimoto, Tokyo, all of Japan

[73] Assignees: Hitachi Koki Co., Ltd.; Hitachi, Ltd., both of Tokyo, Japan

[21] Appl. No.: 240,506

[22] Filed: May 10, 1994

Related U.S. Application Data

[63] Continuation of Ser. No. 753,589, Sep. 3, 1991, abandoned.

[30] Foreign Application Priority Data

Sep. 10, 1990 [JP] Japan ................................ 2-236946

[51] Int. Cl.$^6$ ............................................. B41J 2/435
[52] U.S. Cl. ............................................ 347/258; 359/206
[58] Field of Search ............... 346/6 L, 107 R, 108, 346/160; 347/258, 259, 256, 134; 359/205, 206, 207

[56] References Cited

U.S. PATENT DOCUMENTS

| | | |
|---|---|---|
| 4,919,502 | 4/1990 | Yamakawa . |
| 5,025,268 | 6/1991 | Arimoto et al. ............... 346/108 |
| 5,064,261 | 11/1991 | Itabashi ......................... 359/206 |

FOREIGN PATENT DOCUMENTS

| | | |
|---|---|---|
| 54-126051 | 9/1979 | Japan . |
| 57-144515 | 9/1982 | Japan . |
| 62-265615 | 11/1987 | Japan . |

OTHER PUBLICATIONS

"Algorithm and Computing Program of Latest Interpolation," Jouhou Shori Shitsu (Data Processing Room), vol. 17, No. 5 (1976), pp. 417–425.

*Primary Examiner*—Mark J. Reinhart
*Attorney, Agent, or Firm*—Sughrue, Mion, Zinn, Macpeak & Seas

[57] ABSTRACT

A light scanning device has a light deflector for deflecting a light beam in a scanning mode which is outputted by a light source, and a scanning lens for compensating or reducing an amount of shift in scanning position which is due to the error of the light deflector. The device also forms an image of the light beam thus deflected. At least one surface of the scanning lens is nonarcuate when a section is taken with a plane which is perpendicular to the surface scanned with the light beam and which contains the normal of the section taken with the surface. Owing to this construction, the light scanning device is suitable for a high precision laser printer.

10 Claims, 3 Drawing Sheets

LIGHT SCANNING DEVICE WITH PLURAL RADII SCANNING LENS SYSTEM

This is a Continuation of application Ser. No. 07/753,589 filed Sep. 3, 1991 abandoned.

FIELD OF THE INVENTION

This application is based on and claims priority from Japanese Application No. Hei. 2-236946 filed Sep. 10, 1990, the disclosure of which is incorporated herein.

This invention relates to light scanning devices, and more particularly to a light scanning device suitable for a laser beam printer which performs a printing operation with high precision.

BACKGROUND OF THE INVENTION

In a laser beam printer, heretofore an $F\theta$ lens is used in combination with a rotary polygon mirror, to scan a photosensitive drum with the laser beam. One of the problems involved in deflecting the laser bean in a scanning mode, is that the scanning pitch becomes irregular because of the fall error of the reflecting mirror of the rotary polygon mirror. In order to solve this problem, a method has been proposed in the art in which an anamorphic optical system having a cylindrical lens surface and a toric lens surface is provided to give a surface fall compensating function to the $F\theta$ lens system (cf. Japanese Patent Application (OPI) No's. 126051/1979 and 144515/1982 (the term "OPI" as used herein means an "unexamined published application")), and in addition a method has been disclosed in which the curvature of a toric lens in the direction in which it shows a surface fall compensating function varies with the position of deflection (cf. Japanese Patent Application (OPI) No. 265615/1987). The section containing the optical axis of each of these lenses is arcuate both in the scanning direction and in the scanning vertical direction.

On the other hand, recently there has been a strong demand for the provision of a high precision laser beam printer. In order to fill this demand, it is necessary to reduce the diameter of the light spot formed on the scanning surface; that is, it is essential to form an optical system large in numerical aperture. The power of the $F\theta$ lens is, in general, greater in the scanning vertical direction than in the scanning direction, and therefore as the numerical aperture increases, the effect of the spherical aberration cannot be disregarded which is produced by the whole optical system, thus lowering the image-forming characteristic.

Furthermore, in the case where the printer is used with the numerical aperture changed, because of the spherical aberration, the position of the best image point is changed.

SUMMARY OF THE INVENTION

Accordingly, an object of this invention is to eliminate the above-described difficulties accompanying a conventional laser printer.

More specifically, an object of the invention is to provide a light scanning device suitable for a high precision laser printer.

The foregoing objects and other objects of the invention have been achieved by the provision of a light scanning device having, a light source for outputting a light beam during a scanning mode, a light deflecting means for deflecting the light beam towards a light receptor and a scanning lens system positioned between the light deflecting means and the light receptor, for compensating for a shift in the predetermined scanning light beam position, and for image-forming the light beam thus deflected onto the light receptor. At least one surface of the scanning lens system has substantially a non-arcuate form of which defines a plurality of radii of curvature, in a section taken through a plane perpendicular to a plane scanned with the light beam.

The invention is based on the finding that, in the case where a conventional $F\theta$ lens is employed which is arcuate in the section taken in the scanning vertical direction, the spherical aberration of the whole optical system which is insufficiently compensated can be canceled out by providing an excessively compensated spherical aberration with at least one surface of the $F\theta$ lens made non-arcuate in the section taken in the scanning vertical direction, with the result that the image-forming characteristic is markedly improved.

The nature, principle and utility of the invention will become more apparent from the following detailed description when read in conjunction with the accompanying drawings.

DETAILED DESCRIPTION OF THE PREFERRED EMBODIMENTS

A light scanning device, which constitutes one embodiment of the invention, will be described with reference to FIG. 1.

Figure 1:
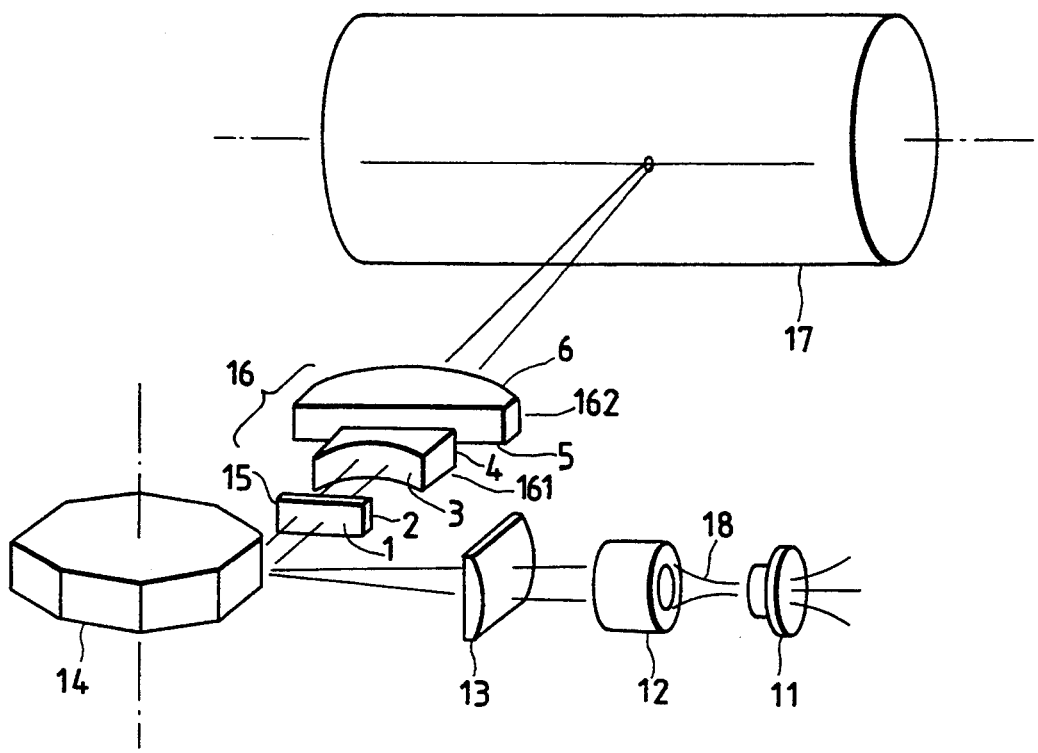
FIG. 1 is an explanatory diagram showing an example of a light scanning device which constitutes one embodiment of this invention.

In FIG. 1, reference numeral 11 designates a light source; 12, a collimator lens; 14, a rotary polygon mirror; 15, a window glass plate for the rotary polygon mirror 14, the window glass plate having surfaces 1 and 2; 16, an $F\theta$ lens group; 161, a first lens of the $F\theta$ lens group 16, the first lens having surfaces 3 and 4; 162, a second lens of the $F\theta$ lens group 16, the second lens having surfaces 5 and 6; 17, a photosensitive drum; and 18, a light beam.

The output light beam of the light source 11 is converted into a parallel light beam by the collimator lens 12. The parallel light beam is flattened in the scanning vertical direction by the cylindrical lens 13, so that a linear image is formed in the vicinity of the reflecting surface of the rotary polygon mirror. The $F\theta$ lens group is an anamorphic aspherical lens which is so positioned that, in the scanning direction the infinite point (infinity) and the photosensitive drum surface are in optical conjugation with each other, while in the scanning vertical direction the vicinity of the reflecting surface of the rotary polygon mirror and the photosensitive drum surface are in optical conjugation with each other. Hence, the linear image formed in the vicinity of the reflecting surface of the rotary polygon mirror is formed on the photosensitive drum surface. In the embodiment, the surface 6 of the second lens 162 in the Fθ lens group 16, which is on the photosensitive drum side, is an anomorphic aspherical surface, and is non-arcuate when sectioned in the scanning vertical direction.

Figure 2:
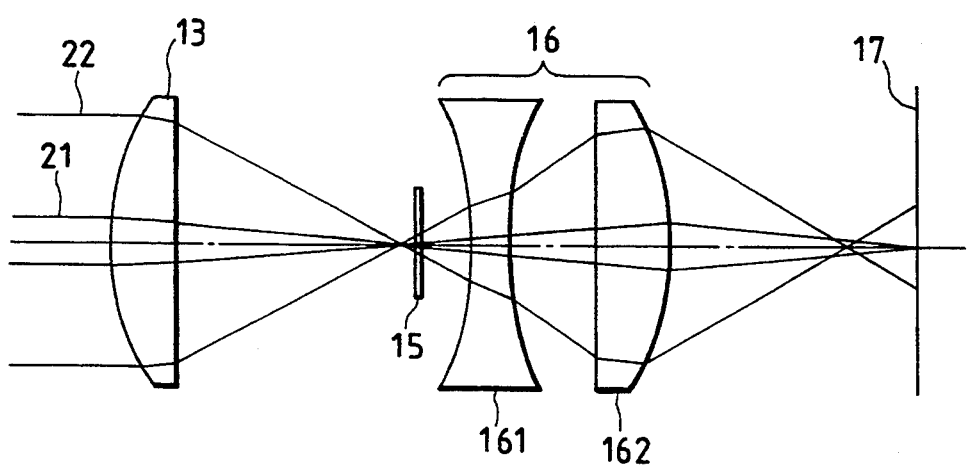
FIG. 2 is an explanatory diagram for a description of the image forming operation of a conventional light scanning device.

In the case where the lenses have arcuate sections in the scanning vertical direction, the image is formed as shown in FIG. 2. In FIG. 2, reference numeral 21 designates paraxial rays; and 22, marginal rays. In this case, the spherical aberration is, in general, not sufficiently compensated, and therefore the marginal rays intersect the optical axis closer to the lens than the paraxial rays 21. The Fθ lens group 16 consists of a convex lens and a concave lens. Even if the lenses have arcuate sections in the scanning vertical direction, the spherical aberration can be zeroed with respect to the rays at two particular incident heights when the concave lens is made of a material low in refractive index and the convex lens is made of a material high in refractive index; however, it is impossible to zero the spherical aberration with respect to the rays at other incident heights. In this connection, it should be noted that selection of the materials is limited because the materials affect other aberrations and the image forming characteristic in the scanning direction.

Figure 3:
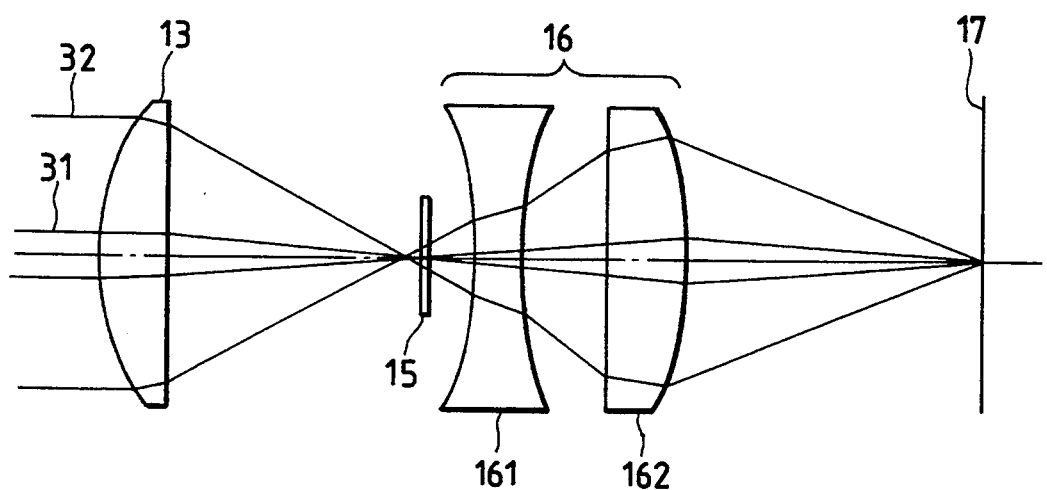
FIG. 3 is an explanatory diagram for a description of the image forming operation of the light scanning device according to the invention.
Figure 4:
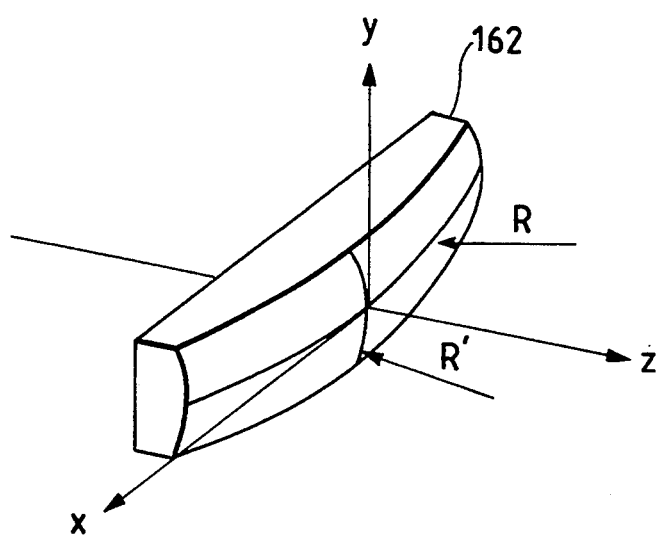
FIG. 4 is an explanatory diagram showing a second lens of an $F\theta$ lens group in the light scanning device according to the invention.
Figure 5:
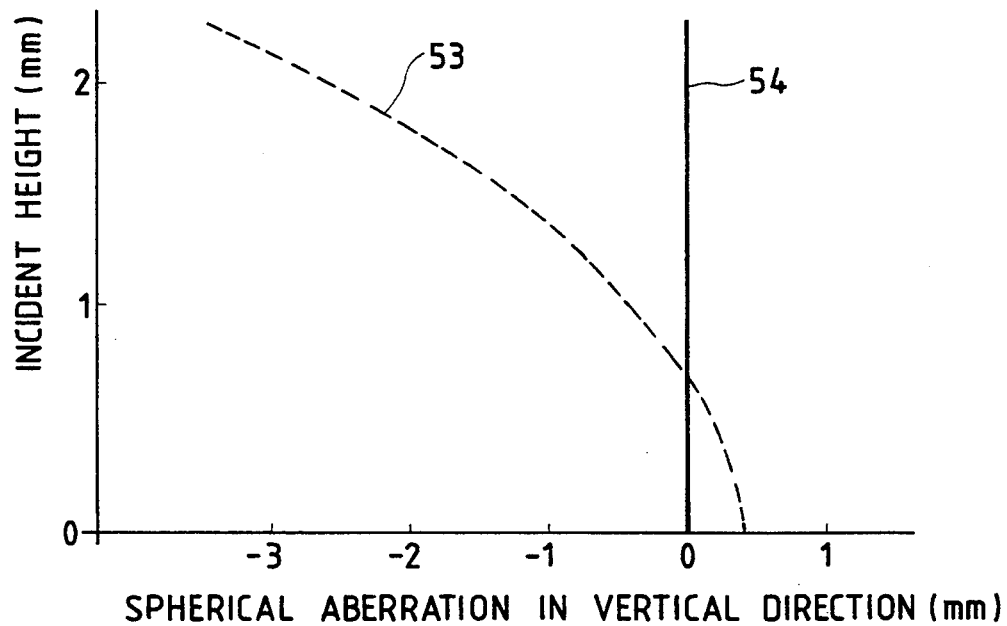
FIG. 5 is a graphical representation indicating spherical aberrations in the light scanning device of the invention and in the conventional light scanning device.

In the case where the surface of the second lens of the Fθ lens group 16, which is on the photosensitive drum side, is not arcuate when sectioned, the image is formed as shown in FIG. 3. In FIG. 3, reference numeral 31 designates paraxial rays; and 32, marginal rays. In this case, the section in the scanning vertical direction is made into a quartic curve and an excessively compensated spherical aberration is produced, so that with respect to the rays at all the incident heights, the spherical aberration of the whole optical system approaches zero.

$$Z = \frac{Y^3}{r_0(1 + \sqrt{1 - (K+1)(Y/r_3)^3})} + aY^4 \quad (1)$$

In the lens surface the section of which is non-arcuate, $\Psi$ is defined by the following equation (2).

$$\psi = (N' - N)\left(8a + \frac{K}{r_0^3}\right) \quad (2)$$

where N and N' are the refractive indexes of the media on both sides of the surface, respectively; ro is the radius of curvature on the optical axis; a is the coefficient of a quartic aspherical surface; and K is the conic constant.

When S' is the distance from the surface vertex, then the shape which is satisfied by the following equation (3) has much effect.

$$-3.0 \times 10^2 \leqq S'\phi \leqq -1.0 \times 10^2 \quad (3)$$

In the equation (2), the coefficient of a fourth-order or less aspherical surface is considered. However, in the case of a more high order aspherical surface, it has the same effect if the shape is similar to that of a fourth-order or less aspherical surface.

In the case where the section in the scanning vertical direction is non-arcuate, the lens data are as listed in the following Table 1:

R is the radius of curvature in the scanning direction; r, the radius of curvature in the scanning vertical direction; d, the inter-surface distance; n, the refractive index; and I, the third-order spherical aberration coefficient in the scanning vertical direction.

The r of the surface No. 6 represents a value on the optical axis.

TABLE 1

| Surface No. | R | r | d | n | I |
|---|---|---|---|---|---|
| 1 | ∞ | 30 | 5.0 | 1.511 | $1.12 \times 10^{-6}$ |
| 2 | ∞ | ∞ | 1.0 | 1.0 | $3.56 \times 10^{-7}$ |
| 3 | −1125 | −1125 | 4.4 | 1.712 | $−6.77 \times 10^{-10}$ |
| 4 | 829 | 829 | 47.2 | 1.0 | $−7.78 \times 10^{-7}$ |
| 5 | ∞ | ∞ | 17.9 | 1.712 | $6.65 \times 10^{-7}$ |
| 6 | −149 | −47.46 | 305.4 | 1.0 | $2.09 \times 10^{-6}$ |
| 7 | ∞ | ∞ | | | |

$a = 1.27 \times 10^{-6}$
$b = 3.02 \times 10^{-7}$
$S'^3\Psi = -2.06 \times 10^2$
$K = 0$
$\Sigma I = -7.27 \times 10^{-7}$ where a, b and K are constants (K being the so-called conic).

Figure 6:
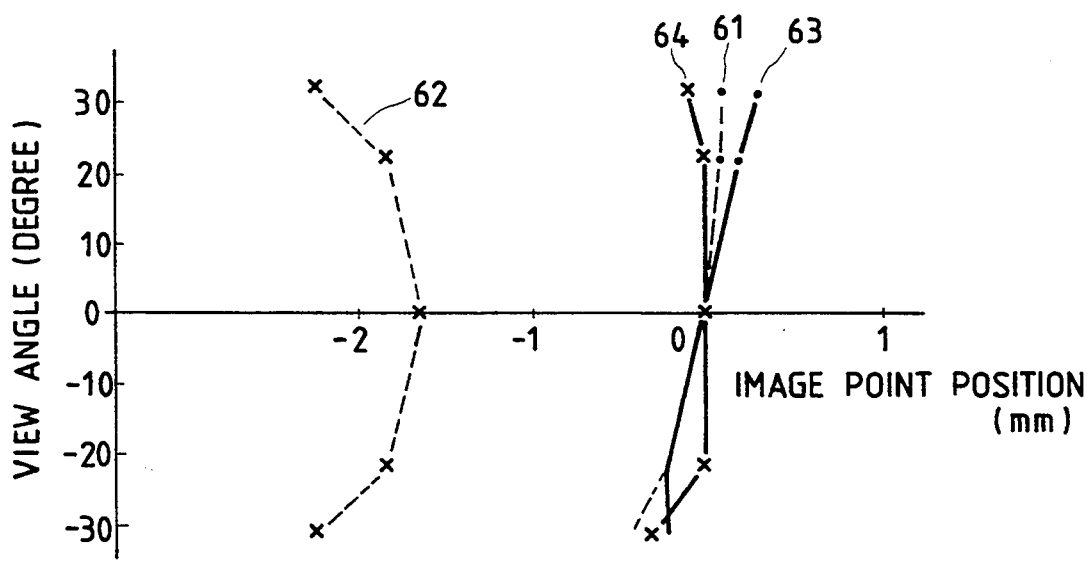
FIG. 6 is a graphical representation indicating image point positions in the light scanning device of the invention and in the conventional light scanning device.

FIG. 6 shows the variations in position of the best image point with the F number changed. More specifically, the line 61 is for the case where the section in the scanning direction is arcuate, and the F number is 112; the line 62, for the case where the section in the scanning direction is arcuate and the F number is 45; the line 63, for the case where the section in the scanning direction is non-arcuate and the F number is 112; and the line 64, for the case where the section in the scanning direction is non-arcuate and the F number is 45. As is seen from FIG. 6, by making the section non-arcuate, the variation in position of the best image point with the F number changed can be greatly reduced. The best image point is defined as follows: That is, by using one hundred rays obtained by equally dividing an aperture stop, the best image point is determined where the MTF value with 10 cycles/mm is maximum.

In the above-described embodiment, the quartic curve is employed. However, instead of the quartic curve, a conic curve may be employed with $K \neq 0$ with effects which are substantially equal to those in the above-described case.

TABLE 2

| Surface No. | R | r | d | n | I |
|---|---|---|---|---|---|
| 1 | ∞ | 30 | 5.0 | 1.511 | $1.12 \times 10^{-6}$ |
| 2 | ∞ | ∞ | 1.0 | 1.0 | $3.56 \times 10^{-7}$ |
| 3 | −1125 | −1125 | 4.4 | 1.712 | $−6.77 \times 10^{-10}$ |
| 4 | 829 | 829 | 47.2 | 1.0 | $−7.78 \times 10^{-7}$ |
| 5 | ∞ | ∞ | 17.9 | 1.712 | $6.65 \times 10^{-7}$ |
| 6 | −149 | −47.46 | 305.4 | 1.0 | $−2.11 \times 10^{-6}$ |
| 7 | ∞ | ∞ | | | |

$a = 0$
$b = 3.02 \times 10^{-7}$
$S'^3\Psi = -2.05 \times 10^2$
$K = -1.0817$
$\Sigma I = -7.46 \times 10^{-7}$ The above-described embodiment may be improved for instance, by making more than one surface nonarcuate, or employing curves higher in order than a quartic curve.

As was described above, according to the invention, the spherical aberration of the whole optical system is compensated by making a surface of the scanning lens system non-arcuate in the section taken in the scanning vertical direction. Hence, even with an optical system large in numerical aperture, an excellent image-forming characteristic can be obtained; that is, a light scanning device suitable for a high precision laser beam printer can be realized according to the invention. Furthermore, the shift in position of the best image point due to the switching of the numerical aperture can be minimized, and therefore the image-forming characteristic can be maintained excellent even when the print dot density is changed. In addition, the surface non-arcuate in section is in the rear stage of the light deflecting means with respect to the overall optical system, and therefore the aberration can be compensated according to the position of deflection.

While the invention has been described in connection with the preferred embodiment, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A light scanning device comprising:
   a light source for outputting a light beam during a scanning mode;
   a light deflecting means for deflecting the light beam towards a light receptor; and
   a scanning lens system positioned between said light deflecting means and said light receptor, for compensating for a shift in the predetermined scanning light beam position, and for image-forming the light beam thus deflected onto the light receptor, wherein:
   at least one surface of said scanning lens system individually defines a plurality of radii of curvature, in a section taken with a plane perpendicular to a plane scanned with said light beam.

2. A light scanning device as claimed in claim 1, in which said curvature of said at least one substantially non-arcuate surface is decreased as the distance from a center part of said scanning lens system to outside increases.

3. A light scanning device comprising:
   a light source for outputting a light beam during a scanning mode;
   a light deflecting means for deflecting the light beam towards a light receptor; and,
   a scanning lens system positioned between said light deflecting means and said light receptor, for compensating for a shift in the predetermined scanning light beam position, and for image-forming the light beam thus deflected onto the light receptor, wherein:
   at least one surface of said scanning lens system is substantially non-arcuate, in a section taken in a plane perpendicular to a plane scanned with said light beam, and wherein the surface is aspherical and satisfies the following relationship, $$-3.0 \times 10^2 \leq S'^3 \Psi \leq -1.0 \times 10^2$$

where $S'$ is the distance from the vertex of said surface to the point where the elogation of a light beam refracted by said surface intersects the optical axis, and $\phi$ is the value defined by the following equation:

$$\Psi = (N' - N)(8a + K/r_0^3)$$

wherein $N'$ and $N$ are the refractive indexes of the media on both sides on said surface, respectively, $r_0$ is the paraxial radius of curvature of said surface, $K$ is the conic constant of said surface, and $a$ is the coefficient of a fourth-order aspherical surface 4. A light scanning apparatus comprising:
   a photosensitive drum;
   a light beam source for generating a light beam;
   a light beam deflector which receives the light beam from said light beam source and deflects the light beam towards said photosensitive drum;
   a scanning lens system positioned between said deflector and said drum, wherein at least one surface of said scanning lens system individually defines a plurality of radii of curvature, in a section taken in a plane perpendicular to a plane scanned with said light beam.

5. A light scanning apparatus as claimed in claim 4, wherein said deflector is a rotary polygon mirror.

6. A light scanning apparatus as claimed in claim 4, wherein said light beam is a laser beam.

7. A light scanning apparatus as claimed in claim 4, wherein said scanning lens is an $F\theta$ lens.

8. A light scanning apparatus comprising: photosensitive drum; a light beam source for generating a light beam;
   a light beam deflector which receives the light beam from said light beam source and deflects the light beam towards said photosensitive drum;
   a scanning lens system positioned between said deflector and said drum, wherein at least one surface of said scanning lens system is substantially non-arcuate, in a section taken in a plane perpendicular to a plane scanned with said light beam, and wherein the surface has an aspherical surface which satisfies the following relationship.

$$-3.0 \times 10^2 \leq S'^3 \Psi \leq -1.0 \times 10^2$$

where $S'$ is the distance from the vertex of said surface to the point where the elogation of a light beam refracted by said surface intersects the optical axis, and $\phi$ is the value defined by the following equation:

$$\Psi = (N' - N)(8a + K/r_0^3)$$

where $N'$ and $N$ are the refractive indexes of the media on both sides on said surface, respectively, $r_0$ is the paraxial radius of curvature of said surface, $K$ is the conic constant of said surface, and $a$ is the coefficient of a fourth-order aspherical surface.

9. A light scanning apparatus as claimed in claim 1, wherein said non-arcuate form of said at least one surface is represented by an even function of at least second order.

10. A light scanning apparatus as claimed in claim 4 wherein said non-arcuate form of said at least one surface is represented by an even function of at least second order.

* * * * *